May 5, 1931.  K. N. FRIESEN  1,803,753
AGRICULTURAL IMPLEMENT
Filed Sept. 30, 1929   2 Sheets-Sheet 1
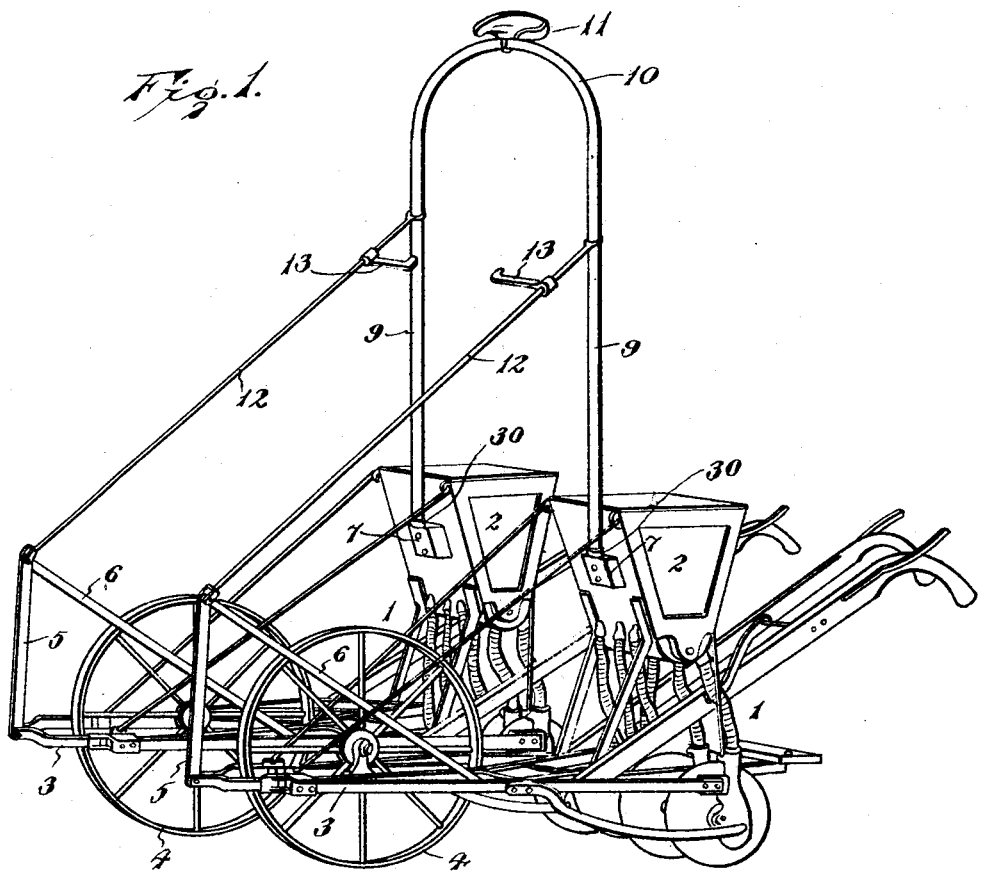
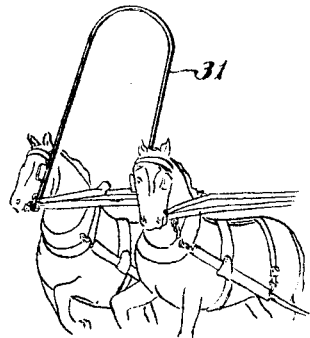
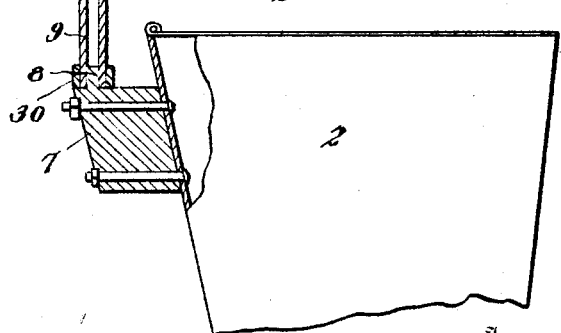
Inventor
K. N. Friesen
By Lacey & Lacey, Attorneys May 5, 1931.　　　K. N. FRIESEN　　　1,803,753
AGRICULTURAL IMPLEMENT
Filed Sept. 30, 1929　　　2 Sheets-Sheet 2

Inventor
K. N. Friesen

By Lacey & Lacey, Attorneys

Patented May 5, 1931

1,803,753

UNITED STATES PATENT OFFICE

KLAAS N. FRIESEN, OF GENESEO, KANSAS

AGRICULTURAL IMPLEMENT

Application filed September 30, 1929. Serial No. 396,291.

The object of this invention is to provide a simple means for coupling a pair of grain drills side by side so that they may be operated to plant seed in parallel rows between rows of standing corn. The invention seeks to provide such a device which will permit the grain drills to automatically compensate for irregular movement of the draft animals and at the same time will prevent relative sidewise movement of the same. The invention is illustrated in the accompanying drawings and will be hereinafter fully set forth.

In the drawings:

Figure 1 is a perspective view showing one form of the invention,

Fig. 2 is an enlarged detail section showing the mounting of one side of the coupling arch, Fig. 5 is a detail showing a means for coupling the head harnesses of the draft animals.

Figure 3:
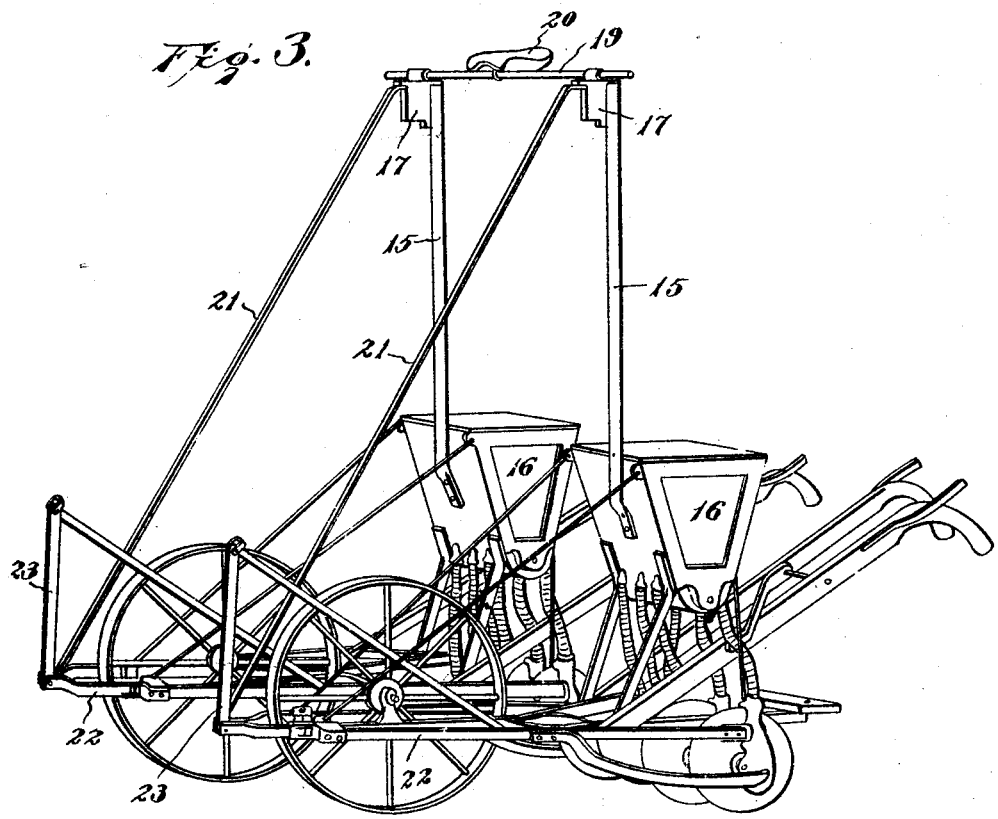
Fig. 3 is a perspective view showing another form of coupling.

The grain drills, indicated at 1, may be of any known or approved construction and are equipped with hoppers 2 in the usual manner. They are also illustrated as having draft beams 3 which carry ground wheels 4 running in front of the cultivating elements and aiding in supporting the drills, draft devices being attached to the front ends of the beams 3 in a well known manner to permit the hitching of draft animals to the machine. Referring more particularly to Fig. 1, it will be noted that a post 5 is provided at the front end of the draft beam of each drill and a brace 6 extends downwardly and rearwardly from the upper end of each post to the respective draft beam so that the post will be braced and will not be apt to be tilted forward under the application of draft. Secured upon the front side of each hopper 2 is a block 7 upon the top of which there is a stud 8, as clearly shown in Fig. 2. Engaged over each stud 8 is one leg 9 of a coupling arch, said legs being hollow and being integrally connected at their upper ends by a curved cross member 10, as clearly shown in Fig. 1, the lower ends of the legs resting on the respective blocks 7 and being reinforced by rings or collars 30 brazed or otherwise firmly secured around the same. This coupling arch may conveniently be formed from a single length of tubing, as is obvious, and when in position it will stand upright to a distance of at least three feet above the hoppers so that it may readily clear the standing corn as the machine is drawn over the field, it being understood that the corn is matured before the wheat is drilled in. A driver's seat 11 is secured upon the top or cross member of the arch and near the upper ends of the legs braces 12 are secured thereto and extend downwardly and forwardly therefrom to be rigidly secured to the upper ends of the respective posts 5. Foot rests 13 are carried by the said braces.

In operation, the driver rides upon the seat 11 and the draft animals will travel between the rows of corn and may be easily controlled by the driver. In actual practice, I contemplate providing an arch 31, shown in Fig. 5, which is to be connected to the head gear of the harness which is placed upon the draft animals so that the inner check reins may be dispensed with and interference with the tops of the standing corn will be avoided. The coupling arch 10 will operate positively to hold the grain drills in the proper spaced relation side by side and will positively prevent relative lateral or sidewise movement thereof but inasmuch as the legs are pivotally engaged with the supporting studs on the fronts of the hoppers, they may rock or rotate about such studs and thereby accommodate the drills to the relative occasional lagging of either of the draft animals. The arch being mounted upon the front sides of the hoppers and being rigidly connected with the draft posts and beams backward tilting of the coupling arch is prevented and the machine may be driven over the field without special attention being given to the balancing of the drills or the dropping of the seed, the machines operating in the usual manner to plant the seed.

Figure 4:
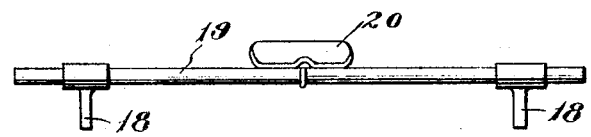
Fig. 4 is a detail elevation of the cross bar or member of the arch shown in Fig. 3.

In Figs. 3 and 4, there is illustrated a form of arch differing in details from that shown in Fig. 1. In the form shown in Fig. 3, the legs 15 of the arch are secured rigidly at their lower ends to the front sides of the hoppers 16 and at the upper end of each leg is secured a block or bracket 17 which extends forward from the respective leg and is of sufficient width to permit a socket to be formed therein for receiving a stud 18 depending from the cross bar 19 adjacent the end of the same, said cross bar being equipped centrally with a driver's seat 20. A brace 21 extends forwardly and downwardly from each block 17 to be secured at its lower end to the front end of the respective draft beam 22 or to the post 23 rising from the front end of the beam. This form of the invention operates in all essential respects in the same manner as the first described form, the studs 18 being pivotally received in sockets in the upper edges of the blocks or brackets 17 so that, while the grain drills will be prevented from relative sidewise movement, they may move longitudinally relative to one another as one or the other draft animal lags.

In both described forms of the invention, it will be seen there is provided a very simple mechanism whereby a pair of grain drills will be coupled together side by side and may be drawn over the field to plant seed between the rows of standing corn.

Having thus described the invention, I claim:

1. The combination with a pair of grain drills, each having a hopper at its rear end, of a high coupling arch mounted at the lower ends of its legs upon the hoppers of the grain drills.

2. The combination with a pair of grain drills arranged side by side, each having a hopper at its rear end, the hoppers being transversely alined, of a high coupling arch having its legs journaled upon the front sides of the respective hoppers of the grain drills to rock about their respective longitudinal axes whereby the arch will resist relative sidewise movement of the grain drills and accommodate relative longitudinal movement thereof.

3. The combination with a pair of grain drills, each having a hopper at its rear end, of a high coupling arch having its legs mounted upon the front sides of the hoppers of the grain drills, and braces secured to said legs near the upper ends thereof and extending downwardly and forwardly therefrom to the front ends of the grain drill frames.

4. The combination with a pair of grain drills having hoppers at their rear ends, of blocks secured upon the front sides of the hoppers and each having an upstanding stud at its upper end, and a coupling arch having tubular legs each pivotally engaged at its lower end over one of said upstanding studs whereby pivotal movement may be had between the arch and either drill.

In testimony whereof I affix my signature.

KLAAS N. FRIESEN. [L. S.]